July 13, 1965

N. SÖRLIN 3,194,165

ELECTRIC MOTOR PUMP

Filed Feb. 28, 1962

INVENTOR
Nils Sörlin
BY James C. Marble
ATTORNEY

INVENTOR
Nils Sörlin
BY Jarvis C. Marble
ATTORNEY

July 13, 1965 N. SÖRLIN 3,194,165
ELECTRIC MOTOR PUMP
Filed Feb. 28, 1962 5 Sheets-Sheet 3

INVENTOR
Nils Sörlin
BY James C. Marble
ATTORNEY

July 13, 1965   N. SÖRLIN   3,194,165
ELECTRIC MOTOR PUMP
Filed Feb. 28, 1962   5 Sheets-Sheet 4

INVENTOR
Nils Sörlin
BY Jarvis C. Marble
ATTORNEY

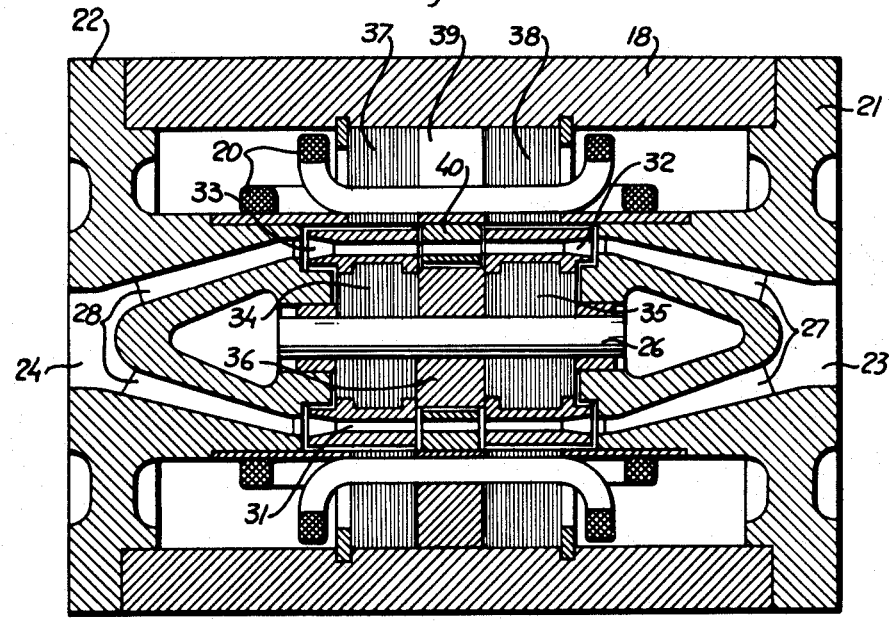

ELECTRIC MOTOR PUMP
Nils Sörlin, 35 Dobelnsgatan, Stockholm Va., Sweden
Filed Feb. 28, 1962, Ser. No. 176,254
6 Claims. (Cl. 103—87)

This invention relates to an electric motor pump.

More particularly this invention relates to an electric motor pump for liquid or gaseous media.

Still more particularly this invention relates to a pump for liquid or gaseous media of the type comprising a squirrel-cage electric induction motor and at least one impeller member consisting of the rotor of said motor with vane-resembling members disposed on said rotor.

One main object of the invention is to provide in the manufacture of the impeller member the possibility of directly obtaining the squirrel-cage of the motor by a moulding process, so as largely to reduce the manufacturing costs of the pump.

A further object of the invention is to provide in a pump having a motor with axial flow a location of the vane-resembling members along the periphery of the rotating part so as to achieve a great peripheral speed of said vane-resembling members and thereby to obtain a large head of the discharge.

Further objects and advantages of the invention will become apparent from the following description considered in connection with the accompanying drawings, which form part of this specification and of which:

FIG. 11 is an axial cross-sectional view of a further embodiment of the invention generally analogous to that shown in FIG. 5 but constructed as a series pump.

Figure 1:
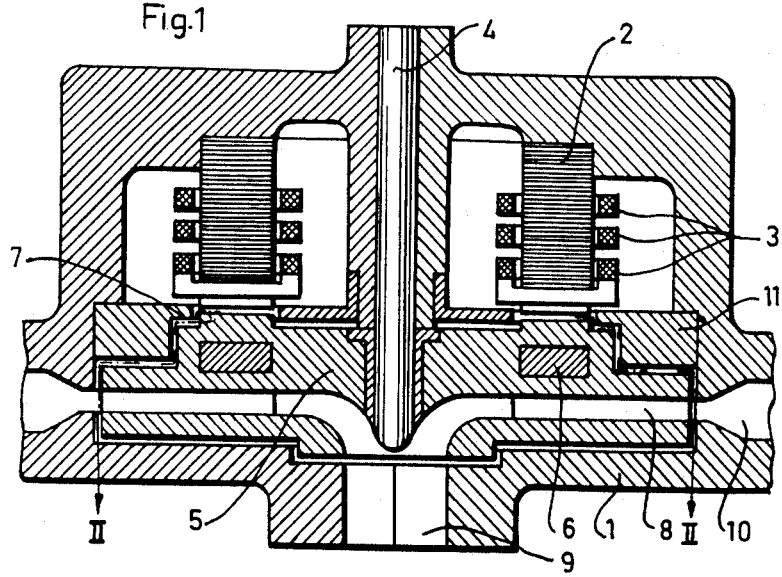
FIG. 1 is an axial cross-sectional view of an embodiment of an electric motor pump constructed according to the invention.
Figure 2:
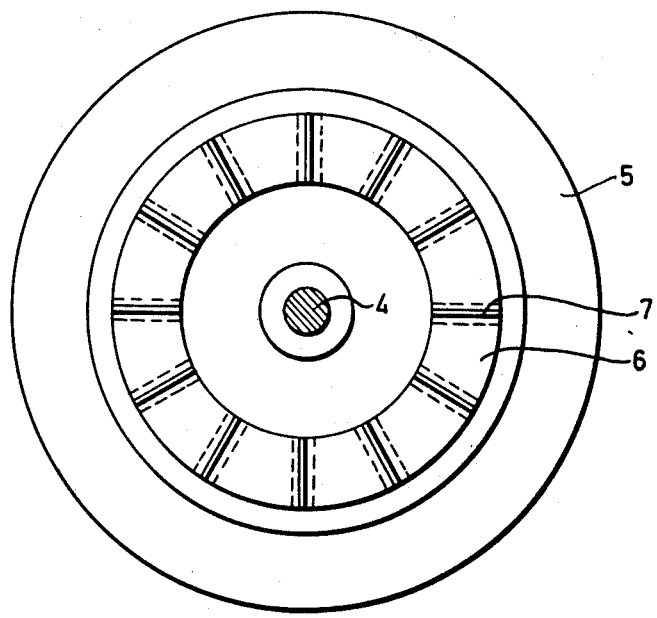
FIG. 2 is a view of the rotor of the motor seen in the direction indicated in FIG. 1 by II—II.

Referring to the drawings, FIGS. 1 and 2 show a pump driven by a squirrel-cage electric induction motor, said pump in the illustrated embodiment being of the centrifugal type. The stator and rotor of the motor are so disposed as to position the air gap between them in planes perpendicular to the motor shaft. The electric motor pump has a casing 1 enclosing a stator 2 with a single phase or polyphase winding 3. Mounted within the casing 1 is a shaft 4 carrying a rotatable disc 5, which forms part of the rotor of the motor, the iron core of said rotor being denoted by 6. The disc 5 is made of metal having good electric conductivity and the iron core 6 is moulded into the same so as to form in part bars 7 and in part the short-circuiting end rings of the squirrel-cage. The disc 5 is formed with impeller vanes or wings 8 which affect the medium to be pumped and cause its raising. The pump casing has an inlet 9 and a spiral or volute 10 where the discharged medium is collected and further conducted to the pressure line. As will be readily understood the material of the impeller member constitutes the rotor squirrel-cage which in turn forms the vanes of the impeller member. In order to reduce the turbulence outside the rotor of the motor an annular member 11 is secured to the casing.

Figure 3:
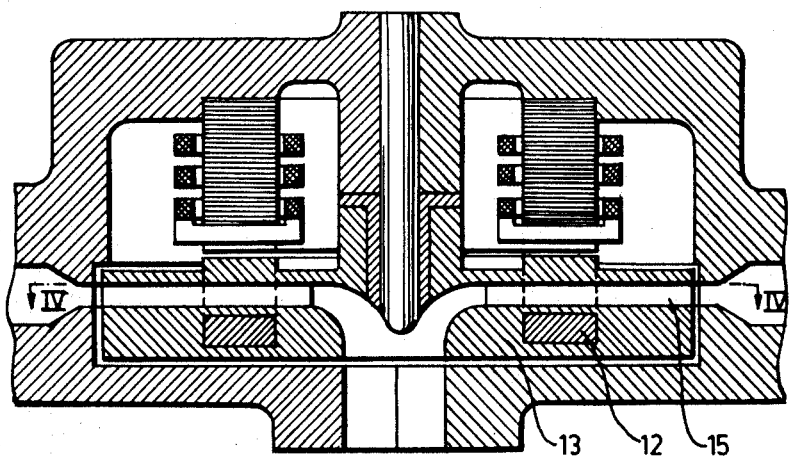
FIG. 3 is an axial cross-sectional view of another embodiment of the invention.

FIG. 3 illustrates another embodiment of the invention also constituted as a centrifugal pump.

Figure 8:
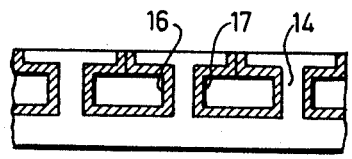
FIGS. 8 and 9 are cross-sectional views following line A—A of FIG. 4 and illustrating one shape of impeller passages formed by the bars.
Figure 9:
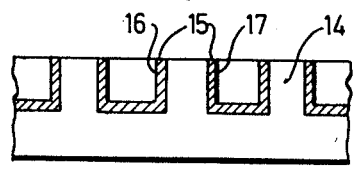

A rotatable disc 13 and the iron core 12 of the rotor form the impeller member of the pump, by the bars of the squirrel-cage being made hollow so as to form vane passages. The bars are formed so as to cause the side wall of one bar and the side wall of the adjacent bar to run together outside the iron core 12 of the rotor and in this way form a vane or wing 15 enclosing a rotor tooth 14 which may have any suitable radial length. How the impeller passages should preferably be formed in this embodiment is easily understood from FIGS. 8 and 9. In the first-mentioned figure the bars are closed and in the last-mentioned figure they are open, which corresponds to half-open and open grooves, respectively, in the rotor. These figures show also that a side wall 17 of one bar and the side wall 17 of the adjacent bar of the rotor form a vane or wing 15. Outside the iron core the vanes are solid and extend to any desired radial length.

Figure 4:
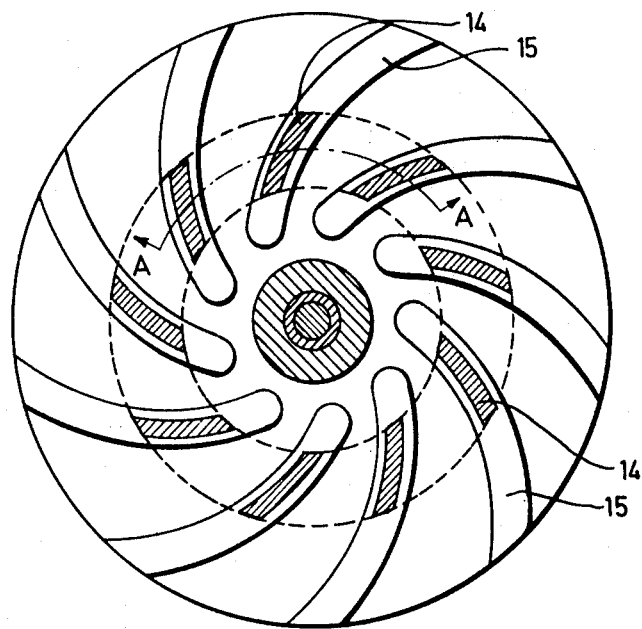
FIG. 4 is a view of the rotor in the plane IV—IV of FIG. 3.
Figure 5:
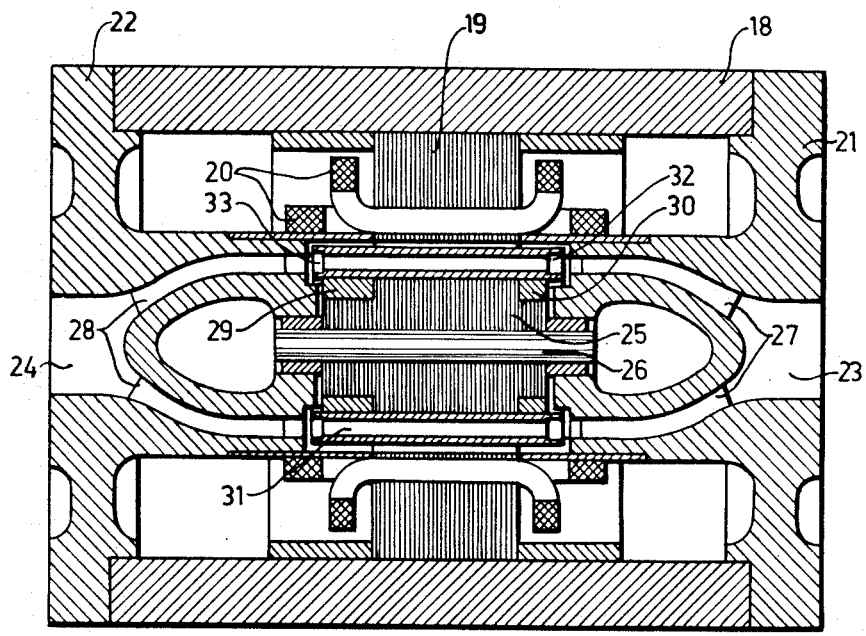
FIG. 5 is an axial cross-sectional view of a further embodiment of the invention consisting of a pump adapted for axial flow.
Figure 6:
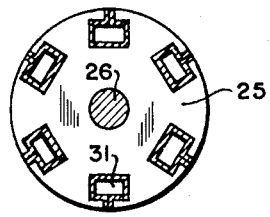
FIGS. 6 and 7 are axial cross-sectional views of the rotor shown in FIGS. 5 and 10, respectively and illustrate two differernt embodiments with bars and impeller passages corresponding to half-open and open grooves, respectively to the core of the rotor.

In the embodiment illustrated in FIG. 5 the invention is applied to a pump having axial flow. The stator 19 of the induction motor with its single phase or polyphase winding 20 is mounted in a casing 18. In one end wall 21 there is an inlet 23 and in another end wall 22 there is an outlet 24 for the medium to be pumped. The rotor 25 of the motor is mounted on a shaft 26 which is rotatably mounted in the end walls 21 and 22. The medium pumped is conducted to the rotor by means of guide vanes 27 and away from the same by means of guide vanes 28. The squirrel-cage bars of the rotor, which in this embodiment are disposed along the periphery of the rotor, are formed analogously to the bars of the embodiment shown in FIGS. 3 and 4, and they form in this manner vanes or wings held together by discs or rings 29 and 30, which also serve as short-circuiting end rings. The bars form vane passages 31. Since the bars or vanes with associated connecting members are intended to be produced by a casting process the inner and outer diameters of the vane passages will not be accurate enough for operational demands. In order readily to remedy this inaccuracy the material of the bars is shaped as studs 32 and 33 at the inlet and outlet of the bars or vanes, said studs extending a short distance outside the vanes, which makes it possible to adjust the diameter to the right size by performing a few simple turning cuts on said studs. For the embodiment in consideration the FIGS. 6 and 7 illustrate some suitable forms of the impeller passages corresponding to half-open and open grooves, respectively, in the iron core of the rotor.

Figure 7:
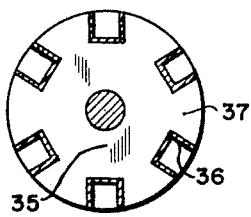
Figure 10:
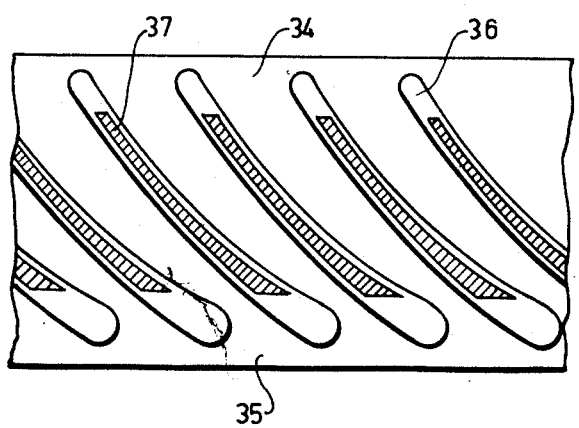
FIG. 10 shows a development of the periphery of the rotor represented in FIG. 7.

In the development shown in FIG. 10 of the periphery of the rotor constructed according to FIG. 7 the vanes are designated by 36, the rotor teeth as 37 and the above mentioned studs by 34 and 35. From this figure it is easily understood that the vanes have drop form which feature from a flow-technical point of view is especially suitable for the purpose in consideration and which makes the vanes suited to be used as supporting surfaces.

The embodiment shown in FIG. 11 is generally analogous with that shown in FIG. 5 but devised so as to constitute a series pump. The stator is subdivided into two sections denoted by 37 and 38, and the rotor in the same manner into two sections denoted by 34 and 35. These sections are kept in mutually spaced relation by spacer sections 36 and 39, respectively. The sections of the stator have a common winding while each of the sections of the rotor is constructed as the rotor in the embodiment according to FIG. 5 which means formed with squirrel-cage bars forming vanes or wings held together by short-circuiting end rings. In this way a two-staged series pump having a correspoindingly increased lifting height is obtained.

The development of this type of series pump may be carried further in such a manner as to result in a series pump having any arbitrary number of stages.

The spacer sections 36 and 39 as well as a line bar ring 40 are assumed to be made of a material having a permeability equal to or less than 1, and in some cases they may be made of such material which moreover is electrically non-conductive. The grooves in the stator may then be formed as closed ones as is illustrated in the FIGS. 5 and 11. It is also possible to form them as open grooves with insulating material moulded around the winding of the stator. In this latter case the spacer section 39 and the line bar ring 40 are preferably made of some paramagnetic material such as copper ferrite. The spacer section 36 is also made of paramagnetic material and provided with groove bars conventional in electric motors and short-circuiting rings. In this way an increased motor output is obtained in comparison with the output obtained with the embodiment disclosed in FIG. 11.

It is obvious to everybody skilled in the art that the inventive idea may be realized in many various ways as regards arrangement of details.

While several embodiments of the invention have been shown and described it is to be understood that this is for purpose of illustration only and that the invention is not to be limited thereby but its scope is to be determined by the appended claims.

What I claim is:

1. In a combination axial flow fluid pump and squirrel-cage electric motor in which one rotor serves as both the pumping rotor and the motor rotor, the combination which comprises a casing having electric motor winding therein and a central axial passage disposed within said winding, one end of said passage forming an inlet and the other end thereof forming an outlet for fluid to be pumped, a rotor rotatably disposed within said passage and having a cylindrical central iron core portion cooperating with said winding to form said motor, a plurality of separated bars on the outer surface of said core portion forming both a motor armature and pumping vanes and defining therebetween pumping channels along said rotor for axial flow pumping of fluid when said motor is running.

2. Apparatus as recited in claim 1 in which said bars are formed as streamlined curved vanes of gradually decreasing cross-section from the inlet to the outlet.

3. Apparatus as recited in claim 2 in which only the central portion of each said vane is formed of iron with the remainder thereof being non-metallic.

4. Apparatus as recited in claim 1 in which said core portion is laminated from a plurality of discs and includes short-circuiting end rings holding said discs together.

5. In electric pump apparatus of the character described having a shaft disposed in a longitudinal cavity therein, a stator surrounding said cavity, a rotor rotatably disposed on said shaft, an inlet at one end of said cavity and an outlet at the opposite end of said cavity, said rotor acting as a pump for moving fluid axially of said shaft and said cavity from said inlet to said outlet, the combination which comprises a cylinder rotatably disposed on said shaft, the center thereof being non-magnetic for short-circuiting said rotor, and a plurality of spaced bars disposed on the periphery of said cylinder longitudinally thereof, said bars having the centers thereof formed of iron forming part of said rotor and the ends thereof being non-magnetic, said bars serving as pumping vanes on said rotor with the outer peripheries thereof extending substantially to the walls of said cavity and the spaces formed between said bars being channels for pumping said fluid through said cavity upon rotation of said rotor.

6. In electric pump apparatus of the character described having a shaft disposed in a longitudinal cavity therein, a stator surrounding said cavity, a rotor rotatably disposed on said shaft, an inlet at one end of said cavity and an outlet at the opposite end of said cavity, said rotor acting as a pump for moving fluid axially of said shaft and said cavity from said inlet to said outlet, the combination which comprises a plurality of iron discs disposed on the center of said shaft for forming said rotor, the outer periphery of said discs having a plurality of spaced indentations whereby when a number of said discs are placed side by side on said shaft their aligned indented peripheries form channels therealong longitudinally of said rotor and said cavity for the movement of said fluid therethrough, and rings disposed on said shaft at each end of said discs for holding said discs together for forming the iron core of said rotor and for short-circuiting said discs, said rings having indentations formed in their periphery corresponding to those in said discs for forming a continuation of said channels longitudinally along the length of said rotor.

References Cited by the Examiner

UNITED STATES PATENTS

| 1,996,460 | 4/35 | Coates | 103—87 |
| 2,537,310 | 1/51 | Lapp | 103—87 |
| 2,700,343 | 1/55 | Pezzillo | 103—87 |
| 2,727,163 | 12/55 | Meyer | 310—268 |
| 2,782,721 | 2/57 | White | 103—87 |
| 2,929,326 | 3/60 | Ingals | 103—1 |

FOREIGN PATENTS

| 1,180,630 | 1/59 | France. |
| 974,755 | 4/61 | Germany. |
| 345,574 | 3/31 | Great Britain. |

LAURENCE V. EFNER, *Primary Examiner.*

ROBERT M. WALKER, *Examiner.*